(12) United States Patent
Yuan et al.

(10) Patent No.: US 12,296,318 B2
(45) Date of Patent: May 13, 2025

(54) COF@HYDROMAGNESITE COMPOSITE MATERIAL AND PREPARATION METHOD AND APPLICATION THEREOF

(71) Applicant: Hunan Institute of Science and Technology, Yueyang (CN)

(72) Inventors: Yongbing Yuan, Yueyang (CN); Hao Ma, Yueyang (CN); Junkang Shi, Yueyang (CN); Congshan Zhou, Yueyang (CN); An Li, Yueyang (CN); Lijun Li, Yueyang (CN); Jundong Xu, Yueyang (CN)

(73) Assignee: Hunan Institute of Science and Technology, Yueyang (CN)

( * ) Notice: Subject to any disclaimer, the term of this patent is extended or adjusted under 35 U.S.C. 154(b) by 0 days.

(21) Appl. No.: 19/001,707

(22) Filed: Dec. 26, 2024

(65) Prior Publication Data
US 2025/0128235 A1 Apr. 24, 2025

(30) Foreign Application Priority Data
Jun. 11, 2024 (CN) .......................... 202410742786

(51) Int. Cl.
*B01J 20/22* (2006.01)
*B01J 20/04* (2006.01)
(Continued)

(52) U.S. Cl.
CPC .......... *B01J 20/226* (2013.01); *B01J 20/043* (2013.01); *B01J 20/3085* (2013.01);
(Continued)

(58) Field of Classification Search
None
See application file for complete search history.

(56) References Cited

U.S. PATENT DOCUMENTS

| 2020/0172764 A1 | 6/2020 | Shin et al. |
| 2020/0290085 A1 | 9/2020 | Yoo et al. |

(Continued)

FOREIGN PATENT DOCUMENTS

WO WO-2019140338 A * 7/2019 ............ B01J 20/226

OTHER PUBLICATIONS

H. Li, et al., Fabrication of octahedral carbon nanocages via an in-situ template approach, Materials Letters, 66(1), 2012, pp. 353-356, https://doi.org/10.1016/j.matlet.2011.08.103 (Year: 2011).*

(Continued)

*Primary Examiner* — Chester T Barry
(74) *Attorney, Agent, or Firm* — Hemisphere Law, PLLC; Zhigang Ma

(57) ABSTRACT

A COF@hydromagnesite composite material and its preparation method and application are disclosed. The preparation method of the composite material includes the following steps. Firstly, diisocyanate organic matters are used as a modifier to carry out chemical reaction with the hydromagnesite powder to obtain modified hydromagnesite powder particles. Secondly, tris(4-aminophenyl)amine and 2,5-dihydroxyterephthalaldehyde are adopted as reaction monomers for reacting to obtain the Covalent Organic Framework (COF) material. And finally, taking modified hydromagnesite powder particle as a core and COF as a shell, the COF@hydromagnesite composite material is prepared. The COF@hydromagnesite composite material synthesized by the method disclosed by the disclosure is simple in preparation process, high in stability and good in selectivity, which can be used for adsorption treatment of lead ions in water.

10 Claims, 2 Drawing Sheets

(51) Int. Cl.
  *B01J 20/30* (2006.01)
  *B01J 20/32* (2006.01)
  *B01J 20/34* (2006.01)
  *C02F 1/28* (2023.01)
  *C02F 101/20* (2006.01)

(52) U.S. Cl.
  CPC ....... *B01J 20/3204* (2013.01); *B01J 20/3265* (2013.01); *B01J 20/3293* (2013.01); *B01J 20/3425* (2013.01); *B01J 20/3475* (2013.01); *C02F 1/288* (2013.01); *C02F 1/281* (2013.01); *C02F 1/285* (2013.01); *C02F 2101/20* (2013.01); *C02F 2303/16* (2013.01)

(56) References Cited

U.S. PATENT DOCUMENTS

| | | | |
|---|---|---|---|
| 2021/0213416 A1* | 7/2021 | Keller | B01J 20/28059 |
| 2021/0246049 A1* | 8/2021 | Keller | B01J 20/043 |
| 2024/0035147 A1 | 2/2024 | Lu et al. | |

OTHER PUBLICATIONS

Veronika Vagvölgyi, et al., Controlled Rate Thermal Analysis of Hydromagnesite, Journal of Thermal Analysis and Calorimetry, vol. 92 (2008) 3, 893-897 (Year: 2008).*
CNIPA, Notification of First Office Action for Chinese application CN202410742786.8, Nov. 7, 2024.
CNIPA, Notification to grant patent right for Chinese application CN202410742786.8, Nov. 19, 2024.

* cited by examiner

COF@HYDROMAGNESITE COMPOSITE MATERIAL AND PREPARATION METHOD AND APPLICATION THEREOF

TECHNICAL FIELD

The disclosure belongs to the technical field of functional materials, and discloses a COF@hydromagnesite composite material and its preparation method and application.

BACKGROUND ART

With the rapid development of the modern industry, metallic lead is widely developed and applied. As one of the most toxic heavy metal ions, $Pb^{2+}$ is highly water-soluble and is not easily metabolized and degraded, so that $Pb^{2+}$ can be accumulated in the environment or in animals and plants for a long time, and finally serious harm is caused to public health, especially damage to the brain and nervous system of children. Therefore, the removal of $Pb^{2+}$ from the environment, particularly from water, has been a global problem and has important significance in ensuring human life and health. Currently, technologies for removing lead ions mainly include chemical precipitation method, electrochemical method, ion exchange method, and adsorption method. Among them, the adsorption method is considered as one of the most effective technologies because of high treatment efficiency, lower cost, energy saving, environmental friendliness, and easy operation and implementation, and the performance of the adsorption material is the key to success or failure of the adsorption method.

Covalent organic frameworks (COFs) are emerging crystalline porous materials, and the frameworks, which are mainly formed by connecting carbon, oxygen and nitrogen through covalent bonds, have ordered and stable structures, large porosity and specific surface area. Compared with the traditional porous solid adsorption materials such as active carbon, resin and inorganic zeolite, the COF structure can be flexibly designed, the pore size can be adjusted, active groups or units can be introduced into an extended framework according to different design requirements, so that COF materials with different functions can be obtained, and the COFs are considered to be one of the most promising materials for adsorbing and removing heavy metal ions. COF materials, however, are often in powder form and are inconvenient to use in water, which limits their use.

The main chemical component of hydromagnesite is basic magnesium carbonate. The hydromagnesite powder is generally sheet-shaped, has low price and high activity, and can be effectively combined with COF materials containing specific groups to form a composite material so as to finish the adsorption treatment of heavy metal ions in water. The hydromagnesite powder particles can provide effective support and loading for COF, and are beneficial to the elution and recovery of the composite material after the adsorption is completed.

In view of the foregoing, there is a need in the art to develop a COF@hydromagnesite composite material and its preparation method, which is used as an adsorption material for lead ions in water so as to achieve the purposes of purifying the water and protecting the environment.

SUMMARY

In order to solve the technical problems, the disclosure aims to provide a COF@hydromagnesite composite material, and its preparation method and application, so as to prepare the COF@hydromagnesite composite material, which has more excellent adsorption performance on lead ions in water and can be recycled for multiple times.

In order to achieve the above purpose, the disclosure provides a COF@hydromagnesite composite material, its preparation method and application, wherein the method includes the following steps:

(1) drying a hydromagnesite powder, adding a certain amount of N, N-dimethylformamide, and stirring to obtain a suspension A;

(2) adding a certain amount of diisocyanate compound and catalyst into the suspension A, stirring for a period of time at a certain temperature, reacting to obtain a suspension B, filtering, washing and drying to obtain the modified hydromagnesite powder;

(3) placing a certain amount of 2,5-dihydroxyterephthalaldehyde and tris(4-aminophenyl)amine into a high-temperature resistant reaction tube, adding mesitylene, absolute ethyl alcohol and phosphoric acid, sealing, and reacting for a period of time at a certain temperature to obtain a mixture C;

(4) adding the modified hydromagnesite powder into a certain amount of N, N-dimethylformamide, and stirring to obtain a suspension D; and (5) taking out the mixture C, adding the same into the suspension D, stirring for a period of time at a certain temperature, reacting to obtain a suspension E, filtering, washing and vacuum drying to obtain the COF@hydromagnesite composite material.

In the step (1) of the preparation method, the median particle diameter of the hydromagnesite powder is 0.7-3.5 μm, preferably 0.8-2.5 μm, and more preferably 1.0-2.0 μm.

In the step (1) of the preparation method, the temperature of the drying is 125-150° C., preferably 130-140° C., and the duration of the drying is 4-12 h, preferably 6-8 h.

In the step (1) of the preparation method, the concentration of the hydromagnesite powder in the suspension is 1.00-50.00 g/L, preferably 5.00-40.00 g/L, and more preferably 10.00-25.00 g/L.

In the step (2) of the preparation method, the mass ratio of the hydromagnesite powder to the diisocyanate compound is 1.0:0.1-1.0, preferably 1.0:0.15-0.8, and more preferably 1.0:0.2-0.4.

In the step (2) of the preparation method, the mass ratio of the hydromagnesite powder to the catalyst is 1.0:0.05-0.30, preferably 1.0:0.08-0.25, and more preferably 1.0:0.1-0.20.

In the step (2) of the preparation method, the temperature of the stirring is 60-150° C., preferably 80-110° C.; the duration of the stirring is 4-12 h, preferably 6-10 h, and more preferably 8-10 h.

In the step (3) of the preparation method, the ratio of the amounts of substance of the 2,5-dihydroxyterephthalaldehyde and tris(4-aminophenyl)amine is 1.0-5.0:1.0; preferably 2.0-4.0:1.0.

In the step (3) of the preparation method, the temperature of the reacting is 130-180° C., preferably 140-160° C.; the duration of the reacting is 48-120 h, preferably 60-72 h.

In the step (4) of the preparation method, the concentration of the modified hydromagnesite powder in the suspension is 1.00-50.00 g/L, preferably 5.00-40.00 g/L, and more preferably 20.00-30.00 g/L.

In the step (5) of the preparation method, the temperature of the stirring is 40-100° C., preferably 50-80° C.; the duration of the stirring is 4-12 h, preferably 6-8 h.

The disclosure provides the COF@hydromagnesite composite material prepared by the preparation method.

The disclosure also provides the application of the COF@hydromagnesite composite material, which is used as an adsorbent to be applied to adsorption treatment of lead ions in water, and specifically includes the following steps: adding the COF@hydromagnesite composite material into a water sample containing lead ions, oscillating and adsorbing for a period of time at a certain temperature, and detecting the concentration of the lead ions before and after adsorption by using an atomic absorption spectrometer. After adsorption, the composite material is regenerated by taking a phosphoric acid solution as an eluent to carry out a circulation experiment.

In the disclosure, the liquid-solid ratio of the water sample to the COF substance in the composite material is 1 L to 1 g; the pH of the water is 1-7, preferably 2-6, and more preferably 3-4; the adsorption temperature is 10-45° C., preferably 25-30° C.; the adsorption duration is 8-24 h, preferably 10-16 h.

The disclosure has the following beneficial effects:

(1) The disclosure synthesizes the COF@hydromagnesite composite material with a core-shell structure, and this novel material has the advantages of simple preparation process and high adsorption efficiency, which achieves the aim of rapidly removing lead ions from the water sample.

(2) The disclosure constructs a novel core-shell structure composite material by taking diisocyanate modified hydromagnesite powder particles as the core of the adsorption material and taking formed by the reaction of a COF material 2,5-dihydroxyterephthalaldehyde and tris(4-aminophenyl)amine as the shell of the adsorption material. The material has abundant nitrogen atoms and oxygen atoms, and the lone pair of the nitrogen atoms and the oxygen atoms form coordination with $Pb^{2+}$ to adsorb lead ions in water.

The COF@hydromagnesite composite material synthesized in the present disclosure has the advantages of simple preparation process, stable structure, reusability and the like, and can meet the requirement of rapid adsorption and separation of lead ions in water.

DETAILED DESCRIPTION OF THE EMBODIMENTS

Figure 1:
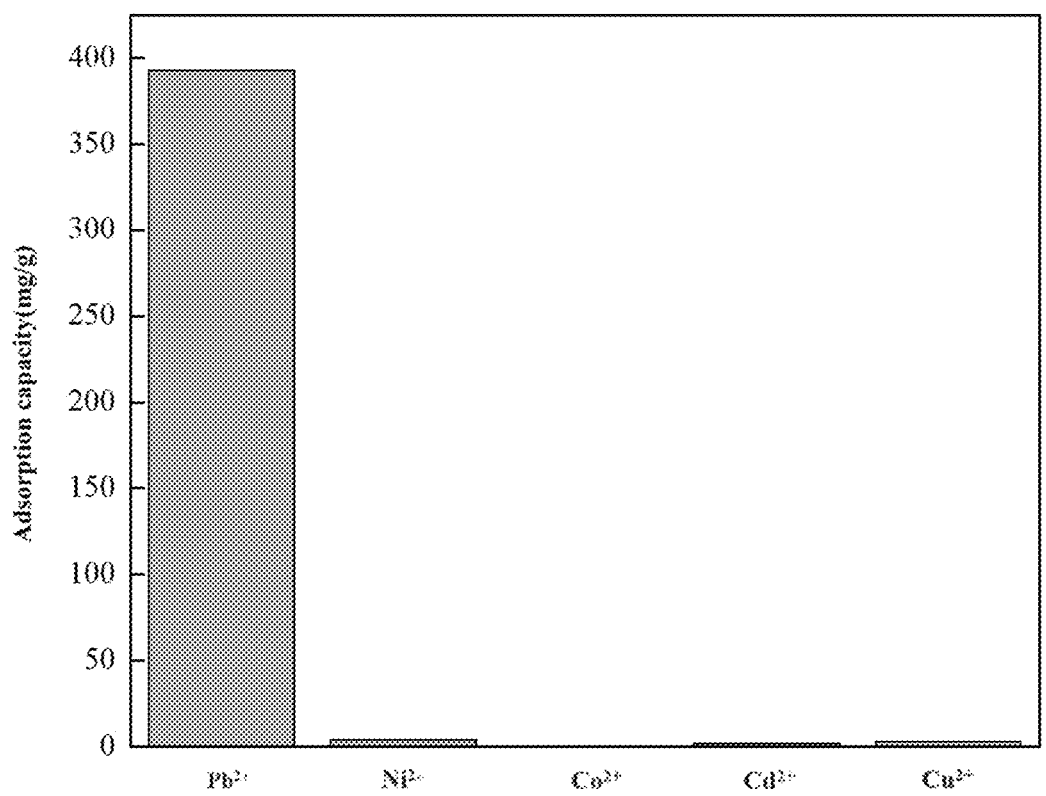
FIG. 1 is a graph showing the adsorption effect of the COF@hydromagnesite composite material on water containing typical heavy metal ions.
Figure 2:
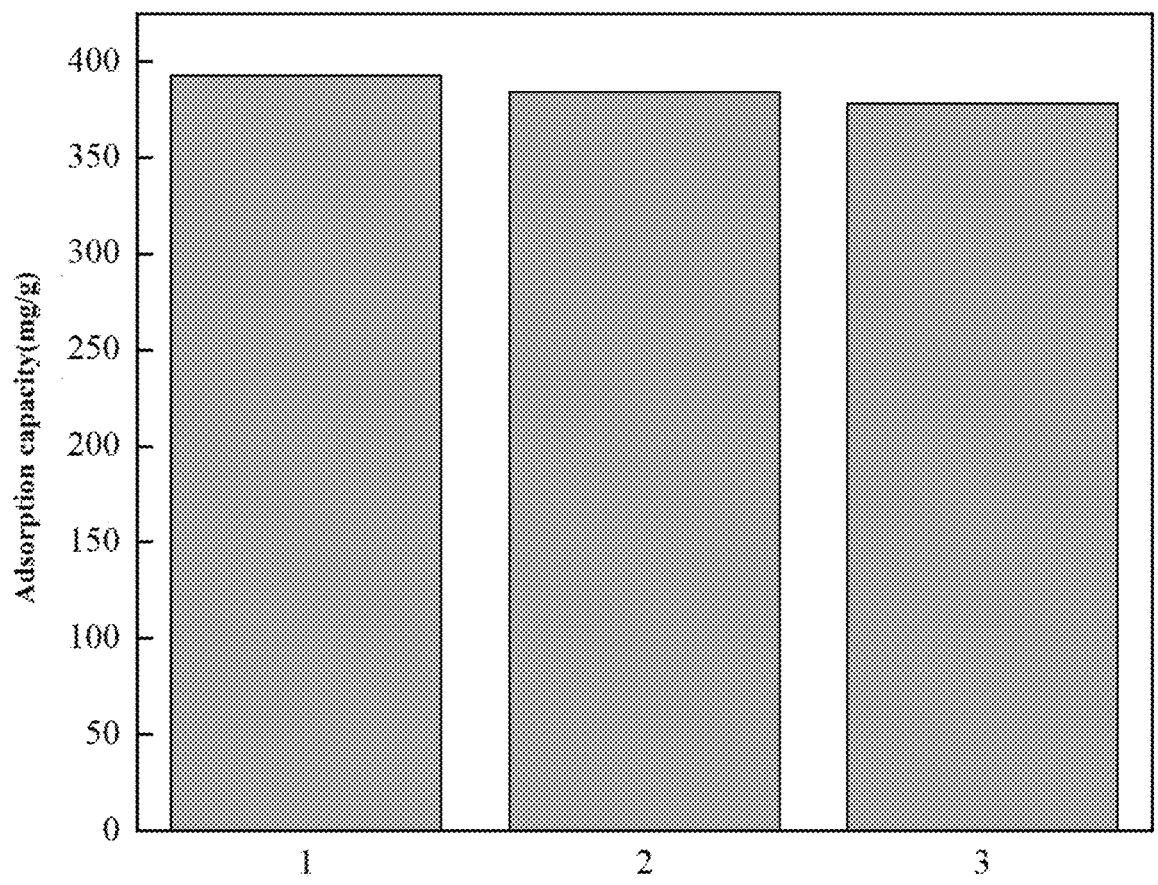
FIG. 2 is a graph showing the adsorption effect of the COF@hydromagnesite composite material for adsorbing typical heavy metal ions in water for three times for recycling.

To make the technical features, objectives, and beneficial effects of the present disclosure more comprehensible, the following describes the technical solutions of the present disclosure in detail, but are not intended to limit the scope of the present disclosure. In the embodiments, each of the starting reagent materials is commercially available, and experimental procedures not specified for specific conditions are routine procedures and routine conditions well known in the art or as suggested by the instrument manufacturer.

Embodiment 1

The present embodiment provides a COF@hydromagnesite composite material and its preparation method and application, and the method includes the following steps:

Step 1: the hydromagnesite powder with the median particle diameter of 1.5 μm was placed in an oven to be dried at 135° C. for 8 h, then the powder was weighed for 2.0000 g, 200 mL of N,N-dimethylformamide was added, and a suspension was obtained by stirring.

Step 2: 0.4000 g of 2,4-toluene diisocyanate and 0.2000 g of stannous octoate were weighed into the suspension and stirred at 100° C. for 8 h. After the reaction, the suspension was washed by centrifugation at 12000 r/min for 3 min. And then drying was performed at 110° C. for 8 h to obtain the modified hydromagnesite powder.

Step 3: 2,5-dihydroxyterephthalaldehyde (0.8 mmol) and tris(4-aminophenyl)amine (0.4 mmol) were weighed into a high-temperature resistant reaction tube, then 1,3,5-trimethylbenzene (4 mL), absolute ethyl alcohol (4 mL) and 2M $H_3PO_4$ (0.4 mL) were added, and the mixture was heated at 150° C. in a sealed manner for 72 h.

Step 4: 1.0000 g of the modified hydromagnesite powder was weighed, the 50 mL of N,N-dimethylformamide was added, and a suspension was obtained by stirring.

Step 5: the mixture obtained in the step 3 was added into the suspension obtained in the step 4, wherein the reaction temperature was 50° C. and the reaction duration was 6 h. Then the product after the reaction was washed by centrifugation four times at a centrifugation rate of 12000 r/min for a centrifugation time of 3 min. Then vacuum drying was carried out at a temperature of 60° C. for 12 h, and the COF@hydromagnesite composite material was prepared.

The COF@hydromagnesite composite material synthesized by the present embodiment was used as an adsorbent to be applied to the adsorption treatment of lead ions in water, and specifically includes the following steps. The liquid-solid ratio of the water sample to the COF substance in the composite material was 1 L:1 g. The pH of the water was 4, and the water contained metal ions such as $Pb^{2+}$, $Ni^{2+}$, $Co^{2+}$, $Cd^{2+}$ and $Cu^{2+}$, with the concentration of 400 mg/L for each kind of metal ions. The adsorption temperature was 30° C. and the adsorption duration was 12 h. And the change of the lead ion concentration before and after adsorption was detected by using an atomic absorption spectrometer. The lead ion adsorption amount of the composite material in the first adsorption experiment was 393 mg/g (based on the mass of COF in the composite material). After adsorption, the composite material was eluted and regenerated by taking a phosphoric acid solution (0.2 mol/L) as an eluent, and three cycles of experiments were conducted, wherein the adsorption quantity of lead ions in the third adsorption experiment was 378 mg/g.

| Experimental Conditions | Embodiment 2 | Embodiment 3 | Embodiment 4 | Embodiment 5 | Embodiment 6 | Embodiment 7 | Embodiment 8 |
|---|---|---|---|---|---|---|---|
| Hydromagnesite | 1.5 μm, Drying Temperature 135° C., 8 h | 3.0 μm, Drying Temperature 125° C., 11 h | 1.2 μm, Drying Temperature 150° C., 6 h | 2.0 μm, Drying Temperature 130° C., 10 h | 3.5 μm, Drying Temperature 140° C., 7 h | 1.2 μm, Drying Temperature 135° C., 9 h | 0.8 μm, Drying Temperature 145° C., 6 h |
| Concentration of Suspension A (g/L) | 15.00 | 10.00 | 5.00 | 40.00 | 25.00 | 50.00 | 25.00 |
| Diisocyanate | 2,5-Toluene Diisocyanate | 2,6-Toluene Diisocyanate | 2,6-Toluene Diisocyanate and 3,5-Toluene Diisocyanate, Mass Ratio 1:1 | Hexamethylene Diisocyanate and 2,5-Toluene Diisocyanate, Mass Ratio 2:1 | Isophorone Diisocyanate | m-Phenylene Diisocyanate | 2,5-Toluene Diisocyanate and 2,6-Toluene Diisocyanate, Mass Ratio 4:1 |
| Mass Ratio of Hydromagnesite to Diisocyanate | 1.0:0.2 | 1.0:0.1 | 1.0:1.0 | 1.0:0.8 | 1.0:0.3 | 1.0:0.3 | 1.0:0.4 |
| Catalyst | Stannous octoate | Dibutyltin Dilaurate | Stannous octoate | Stannous octoate | Dibutyltin Dilaurate | Dibutyltin Dilaurate | Stannous octoate |
| Mass Ratio of Hydromagnesite to Catalyst | 1.0:0.10 | 1.0:0.15 | 1.0:0.20 | 1.0:0.06 | 1.0:0.15 | 1.0:0.20 | 1.0:0.30 |
| Modification Conditions of Hydromagnesite | 90° C. 8 h | 140° C. 6 h | 150° C. 4 h | 80° C. 8 h | 70° C. 12 h | 90° C. 10 h | 110° C. 7 h |
| Ratio of Amount of Substance of 2,5-dihydroxy-terephthal-aldehyde to tris(4-aminophenyl)amine | 1.0:1.0 | 2.0:1.0 | 3.0:1.0 | 4.0:1.0 | 5.0:1.0 | 3.0:1.0 | 2.0:1.0 |
| COF Reaction Conditions | 140° C. 120 h | 150° C. 72 h | 160° C. 60 h | 170° C. 50 h | 180° C. 48 h | 130° C. 84 h | 150° C. 96 h |
| Concentration of Suspension D (g/L) | 10.00 | 20.00 | 30.00 | 40.00 | 50.00 | 5.00 | 20.00 |
| Reaction Conditions of Composite Material | 50° C. 4 h | 60° C. 6 h | 70° C. 9 h | 80° C. 7 h | 90° C. 12 h | 100° C. 6 h | 60° C. 11 h |
| Water pH | 3 | 4 | 2 | 5 | 6 | 4 | 3 |
| Adsorption Conditions | 25° C. 10 h | 30° C. 12 h | 40° C. 8 h | 25° C. 16 h | 20° C. 20 h | 15° C. 24 h | 35° C. 10 h |
| Adsorption Quantity (mg/g) | 385 | 378 | 390 | 379 | 388 | 373 | 385 |
| Adsorption Quantity after Three Cycles (mg/g) | 359 | 358 | 371 | 361 | 362 | 347 | 364 |

The preparation method provided in the second to eighth embodiments had the same steps as those in the first embodiment, but differed in the raw materials, ratios, and other conditions used in each embodiment; the experimental details related to the preparation methods provided in the second embodiment to the eighth embodiment and the test results of the products respectively serving as adsorbents for treating lead ions in the water body are shown in the following table.

Therefore, from the first embodiment to the eighth embodiment, the COF@hydromagnesite composite material prepared in the present disclosure could efficiently and selectively adsorb lead ions in water under the condition that competitive metal ions existed, so as to complete water treatment work.

Finally, it should be noted that the above embodiments are only used to explain the process and characteristics of the present disclosure, but not to limit the technical solution of the present disclosure. Although the present disclosure is described in detail with reference to the foregoing embodiments, persons of ordinary skill in the art should understand that modifications or equivalent replacements can still be made to the present disclosure. Any modification or partial replacement without departing from the spirit and scope of the present disclosure shall fall within the scope of protection of the present disclosure.

What is claimed is:

1. A preparation method of COF@hydromagnesite composite material, comprising:
   (1) drying a hydromagnesite powder, adding a certain amount of N, N-dimethylformamide, and stirring to obtain a suspension A;
   (2) adding a certain amount of diisocyanate compound and catalyst into the suspension A, stirring for a period of time at a certain temperature, reacting to obtain a suspension B, filtering, washing and drying to obtain a modified hydromagnesite powder;
   (3) placing a certain amount of 2,5-dihydroxyterephthalaldehyde and tris(4-aminophenyl)amine into a high-temperature resistant reaction tube, adding mesitylene, absolute ethyl alcohol and phosphoric acid, sealing, and reacting for a period of time at a certain temperature to obtain a mixture C;
   (4) adding the modified hydromagnesite powder into a certain amount of N, N-dimethylformamide, and stirring to obtain a suspension D; and
   (5) taking out the mixture C, adding the same into the suspension D, stirring for a period of time at a certain temperature, reacting to obtain a suspension E, filtering, washing and vacuum drying to obtain the COF@hydromagnesite composite material.

2. The preparation method of COF@hydromagnesite composite material of claim 1, wherein in the step (1), a median particle diameter of the hydromagnesite powder is 0.7-3.5 µm, a temperature of the drying is 125-150° C. and a duration of the drying is 4-12 h; a concentration of the hydromagnesite powder in the suspension is 1.00-50.00 g/L.

3. The preparation method of COF@hydromagnesite composite material of claim 1, wherein in the step (2), the diisocyanate compound is any one or more of 2,4-toluene diisocyanate, 2,5-toluene diisocyanate, 3,5-toluene diisocyanate, 2,6-toluene diisocyanate, m-phenylene diisocyanate, isophorone diisocyanate or hexamethylene diisocyanate, and a mass ratio of the hydromagnesite powder to the diisocyanate compound is 1.0:0.1-1.0; the catalyst is any one of stannous octoate or dibutyltin dilaurate, and a mass ratio of the hydromagnesite powder to the catalyst is 1.0:0.05-0.30; a temperature of the stirring is 60-150° C. and a duration of the stirring is 4-12 h.

4. The preparation method of COF@hydromagnesite composite material of claim 1, wherein in the step (3), a ratio of the amounts of substance of the 2,5-dihydroxyterephthalaldehyde and tris(4-aminophenyl)amine is 1.0-5.0:1.0; a temperature of the reacting is 130-180° C.; a duration of the reacting is 48-120 h.

5. The preparation method of COF@hydromagnesite composite material of claim 1, wherein in the step (4), a concentration of the modified hydromagnesite powder in the suspension is 1.00-50.00 g/L.

6. The preparation method of COF@hydromagnesite composite material of claim 1, wherein in the step (5), a temperature of the stirring is 40-100° C. and a duration of the stirring is 4-12 h.

7. The COF@hydromagnesite composite material prepared by the preparation method according to claim 1.

8. An application of the COF@hydromagnesite composite material of claim 7 used as an adsorbent, wherein the COF@hydromagnesite composite material is applied to adsorption treatment of lead ions in water.

9. The application of the COF@hydromagnesite composite material used as an adsorbent of claim 8, wherein the COF@hydromagnesite composite material is applied as an adsorbent to the adsorption treatment of lead ions in a water, and specifically comprises: adding the COF@hydromagnesite composite material into a water sample containing lead ions, and performing adsorption for a period of time at a certain temperature; and regenerating the composite material by taking a phosphoric acid solution as an eluent after adsorption to carry out a circulation experiment.

10. The application of the COF@hydromagnesite composite material used as an adsorbent of claim 9, wherein a pH of the water is 1-7, the temperature is 10-35° C., and an oscillating time is 8-24 h.

* * * * *